(12) United States Patent
Sumimoto

(10) Patent No.: US 6,632,096 B1
(45) Date of Patent: Oct. 14, 2003

(54) METHOD AND APPARATUS FOR TEACHING AND LEARNING

(76) Inventor: Haruyuki Sumimoto, Minamiurawabyuhaitsu 106, 1-22, 2-chome, Shinmei, Urawa-shi, Saitama, 336-0023 (JP)

( * ) Notice: Subject to any disclaimer, the term of this patent is extended or adjusted under 35 U.S.C. 154(b) by 0 days.

(21) Appl. No.: 09/437,902

(22) Filed: Nov. 9, 1999

Related U.S. Application Data

(63) Continuation-in-part of application No. 09/079,181, filed on May 14, 1998, now abandoned.

(30) Foreign Application Priority Data

May 26, 1997 (JP) .............................................. 9-170857

(51) Int. Cl.⁷ ................................................. G09B 7/00
(52) U.S. Cl. ...................... 434/322; 434/323; 434/327; 434/335; 434/344; 434/353; 434/362
(58) Field of Search .............................. 434/161, 167, 434/169, 176, 177, 322, 323, 324, 325, 327, 332, 335, 336, 337, 344, 348, 349, 350, 351, 352, 353, 354, 362

(56) References Cited

U.S. PATENT DOCUMENTS

| 5,141,439 A | 8/1992 | Cousins ...................... 434/178 |
| 5,810,599 A | 9/1998 | Bishop ........................ 434/157 |
| 5,885,083 A | 3/1999 | Ferrell ......................... 434/156 |

FOREIGN PATENT DOCUMENTS

JP          2780924          5/1998

*Primary Examiner*—John Edmund Rovnak
(74) *Attorney, Agent, or Firm*—Squire, Sanders, & Dempsey L.L.P.

(57) ABSTRACT

A method and apparatus for a computer-based teaching system includes modifying a text file by inserting a first predetermined character at a first end of a first selected information element, and also inserting a second predetermined character at a second end of the first selected information element. A blank box is created in an area defined by the first and second predetermined character. The blank box replaces the first selected information element. Data is stored in a memory, with the data representing the first selected information element. A user interface is provided, which enables selective display of either the blank box or the first selected information element.

17 Claims, 5 Drawing Sheets

FIG. 1

```
<How to make gas>           ┌──11
  @cloud.ico   H2   Add [HCl] or [H2SO4] water solution to solid Zn
 /                              └──11
12               O2   Add [MnO2] as a catalyst to a thin [H2O2]
                      water solution
                      or add [MnO2] as a catalyst to a [KClO3]
          @           and heat 12 ──            Cl2  Add [MnO2] as an oxidizer to dense HCl and heat HCl  Add dense [H2SO4] water solution as an oxidizer
                      to NaCl and heat SO2  Add dense [H2SO4] water solution as an
                      oxidizer to Cu and heat NO   Add thin [HNO3] water solution to Cu
```

FIG. 2

FIG. 3

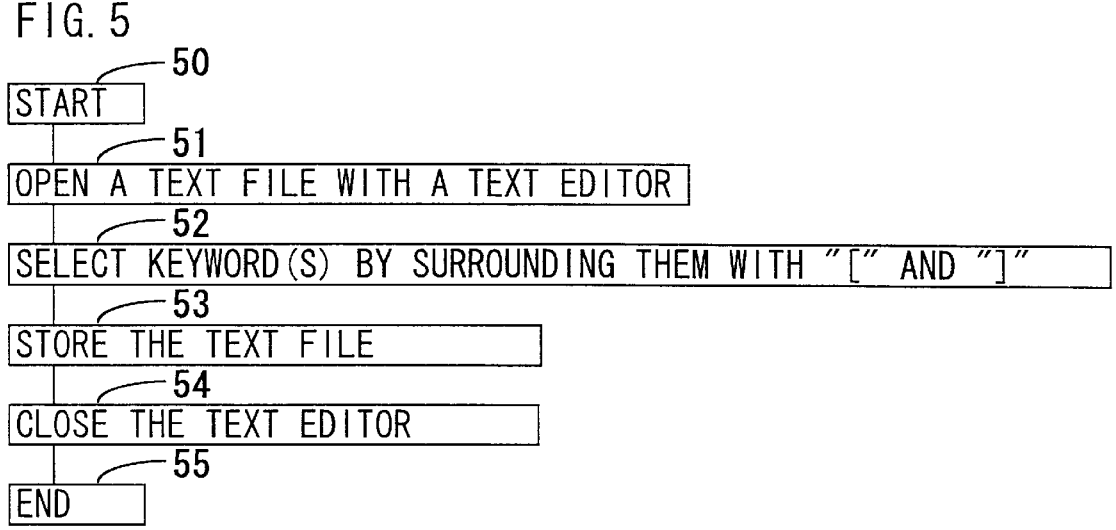
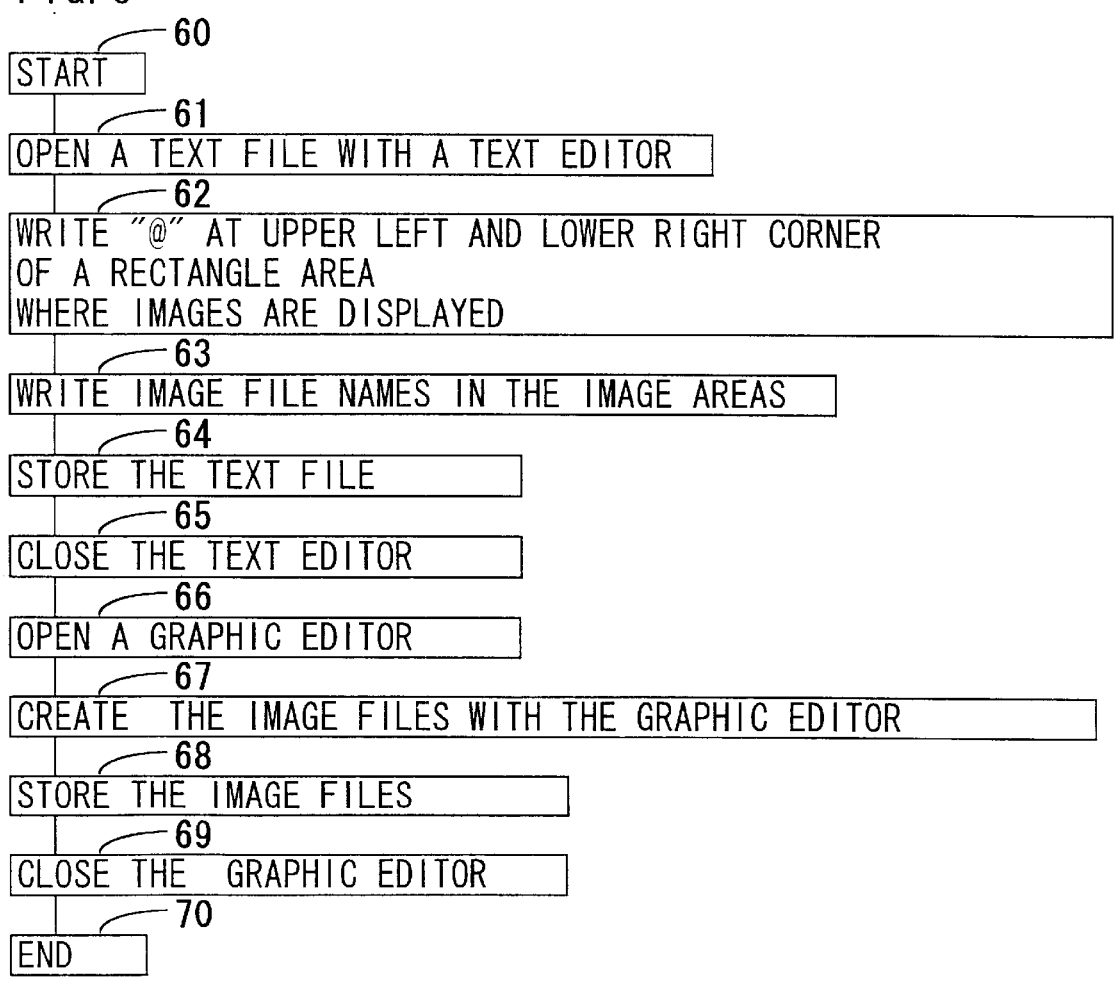

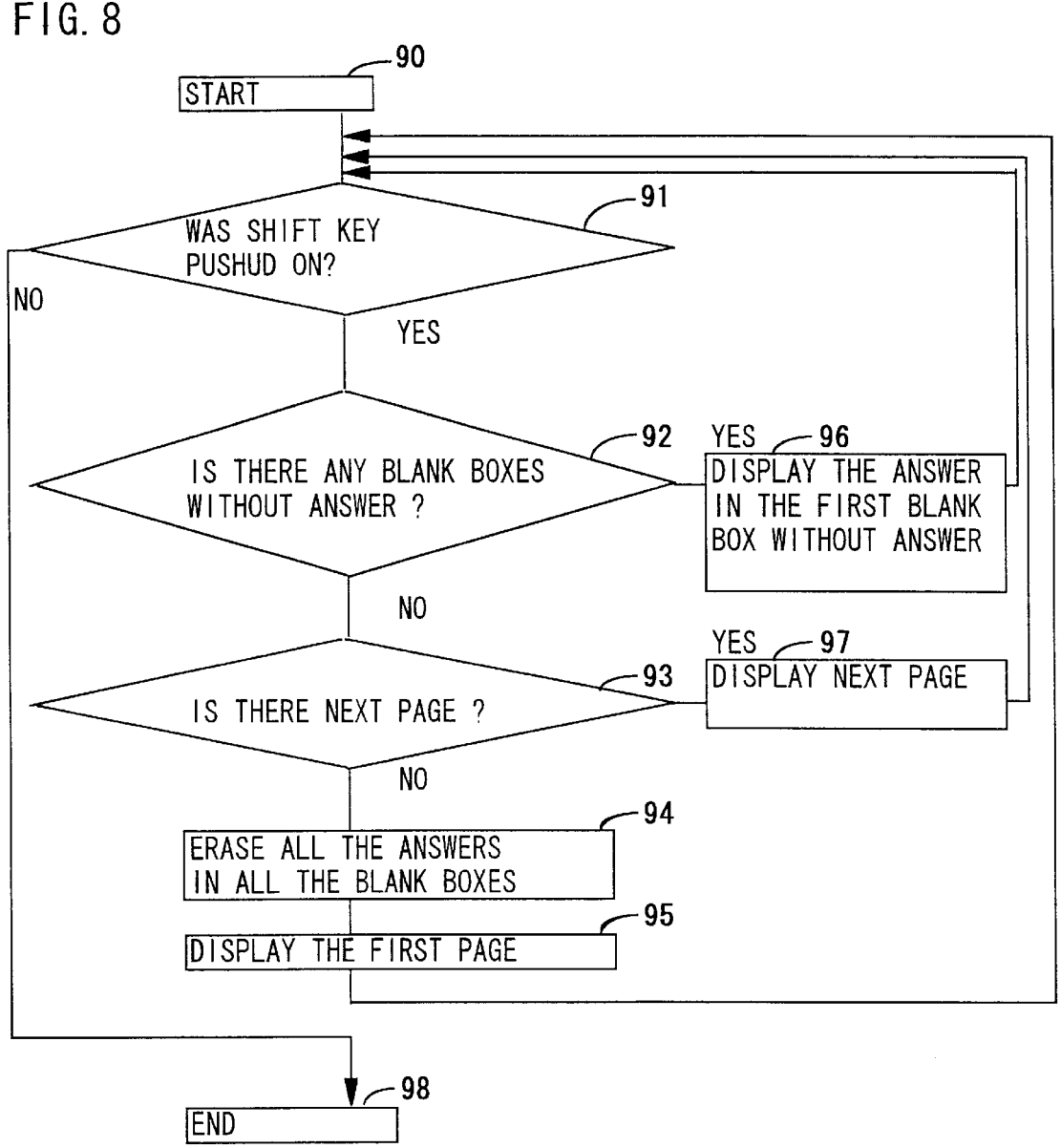

METHOD AND APPARATUS FOR TEACHING AND LEARNING

CROSS-REFERENCE TO RELATED APPLICATIONS

This application is a continuation-in-part of application Ser. No. 09/079,181, filed on May 14, 1998, abandoned.

BACKGROUND OF THE INVENTION

1. Field of the Invention

The present invention relates to a method and apparatus for converting a standard text file into a text file for a "fill-in-the-blanks" type of teaching method and apparatus which can be implemented on a computer for learning information using the converted text file.

2. Description of the Related Art

Computer technology has been rapidly advancing, and personal computers have recently been used as teaching and learning tools. There are already a number of prior art systems which display "fill-in-the-blanks" questions. However, no prior art method has been directed towards how to easily create a data file for a "fill-in-the-blanks" type of question and answer program.

U.S. Pat. No. 5,885,083 issued Mar. 23, 1999 to Ferrell, and discloses a method and system for interactive speech training. This invention includes Sentence Completion and Story Completion. According to the disclosed method, sentences with an omitted word or words must be stored in memory. Further, the correct answer corresponding to the omitted word or words and incorrect answers must also be stored.

U.S. Pat. No. 5,810,599 issued Sep. 22, 1998 to Bishop, and discloses a system and method for interactive audio-visual foreign language maintenance. This invention utilizes a "fill-in-the-blanks" method for teaching foreign languages to students. According to this method, it is necessary for the system to store two kinds of sentences. One sentence comprises lines of dialog with selected word left blank, and the other sentence comprises the completed lines of dialog.

In both of these references, two kinds of data must be stored in a file or files on a storage medium. Accordingly, a user must edit both kinds of the data when creating or updating them. This is so troublesome that a dedicated program for editing the data is necessary.

Further, both prior art references require a user to input an answer. If a user inputs an answer, the computer can evaluate the answer and indicate whether the user input is correct. However it is time-consuming for a user to input an answer using a keyboard or other conventional input devices, especially when the questions are numerous.

HTML files and browsers such as Netscape and Microsoft Internet Explorer are well known in the art. A "link" which is used in a HTML file is also well known in the art. A link to another place in the same document looks like this:

<A HREF="#target">Click here.<A>

If the user clicks on the words 'Click here.', the browser will jump to the location in the current document marked with <A NAME="target"> This is the target of above link.</A> Using a link, a data file for a "fill-in-the-blanks" program can be made as follows:

The <1> of the invention, which should be as short and specific as possible, should appear as a <2> on the <3> page of the specification, if it does not otherwise appear at the beginning of the application.

1=title
2=heading
3=first

However, a user will have difficulty in converting an ordinary text file into the data file like this. A user must extract the keywords, store them in an appropriate location, and link them. In order to do this, therefore, a dedicated program is necessary.

Not only text but also images can also be displayed. It is known that images often gives a student a strong impression, and therefore enhances the learning experience. The prior art discussed above displays images. However the position where images are displayed is fixed. After the above invention's systems are completed, the display layout is not movable.

Below is a example of an HTML file.

<HTML>
  <HEAD>
    triangle
  </HEAD>
  <BODY>
    This is a regular triangle.<BR>
    <IMG SRC="triangle.jpg" WIDTH="60" HEIGHT="40">
  </BODY>
</HTML>

Using an HTML file, both text and images can be displayed in a window on the display device. The positions where images are displayed are not fixed. The position where images are displayed can be altered by altering the HTML file. However it is not visually clear for a user where and how large images are displayed when a user views the HTML file.

U.S. Pat. No. 5,141,439, issued Aug. 25, 1992 to Cousins, discloses a keyword teaching and testing method. According to this reference, a student does not use a computer but uses printed matter, something to write with, and something to delete keywords with, such as typewriter correction fluid. It is difficult and time-consuming to delete keywords physically especially when printed characters are small.

SUMMARY OF THE INVENTION

It is therefore an object of the present invention to provide a method and system for learning information by keyword methodology using a computer which enables a user to easily convert a text file into a text file for a "fill-in-the-blanks" question program.

Another object of the present invention is to provide a method and system for presenting already acquired information through as easy operation as possible.

A still further object of the present invention is to provide a method and system for presenting images with text in a window on a display device which enables a user to visually control and understand the position and size of the images when editing the text file.

The invention, therefore, includes a method of creating a computer-based teaching system, with the method comprising modifying a text file by inserting a first predetermined character at a first end of a first selected information element, and inserting a second predetermined character at a second end of the first selected information element. A blank box is created in an area defined by the first and second predetermined character. The blank box replaces the first selected information element. Data is stored in memory, representing the first selected information element. A user interface is provided, which enables selective display of either the blank boxes or the first selected information element.

The invention also includes an apparatus for teaching information. The apparatus comprises a display device, and an input device for inputting commands of a user. A computer is connected to the display device and the input device, with the system including an editing unit for editing a text file, and a storage unit for storing the text file. A position determining unit is provided for determining selected positions of predetermined characters with respect to selected information elements in the text file. A converting unit converts the text file into a combination of text and selected blank boxes based upon the selected information elements.

BRIEF DESCRIPTION OF THE DRAWINGS

FIG.1 is an example of a text file according to the present invention;

FIG.2 is a "screen shot" of window on the display device of the present invention showing the text file shown in FIG.1;

FIG.3 is a screen shot of the same window as shown in FIG.2 displaying answers one by one in the blank boxes by pressing the Shift key on a keyboard;

FIG.5 is a flow chart of how to convert a text file into a text file for a "fill-in-the-blanks" question program according to the present invention;

FIG.6 is a flow chart of how to edit a text file to show an image with text;

FIG.8 is a flow chart of the process of how to determine a next process when a user presses the Shift key.

DETAILED DESCRIPTION OF THE PREFERRED EMBODIMENTS

Figure 4:
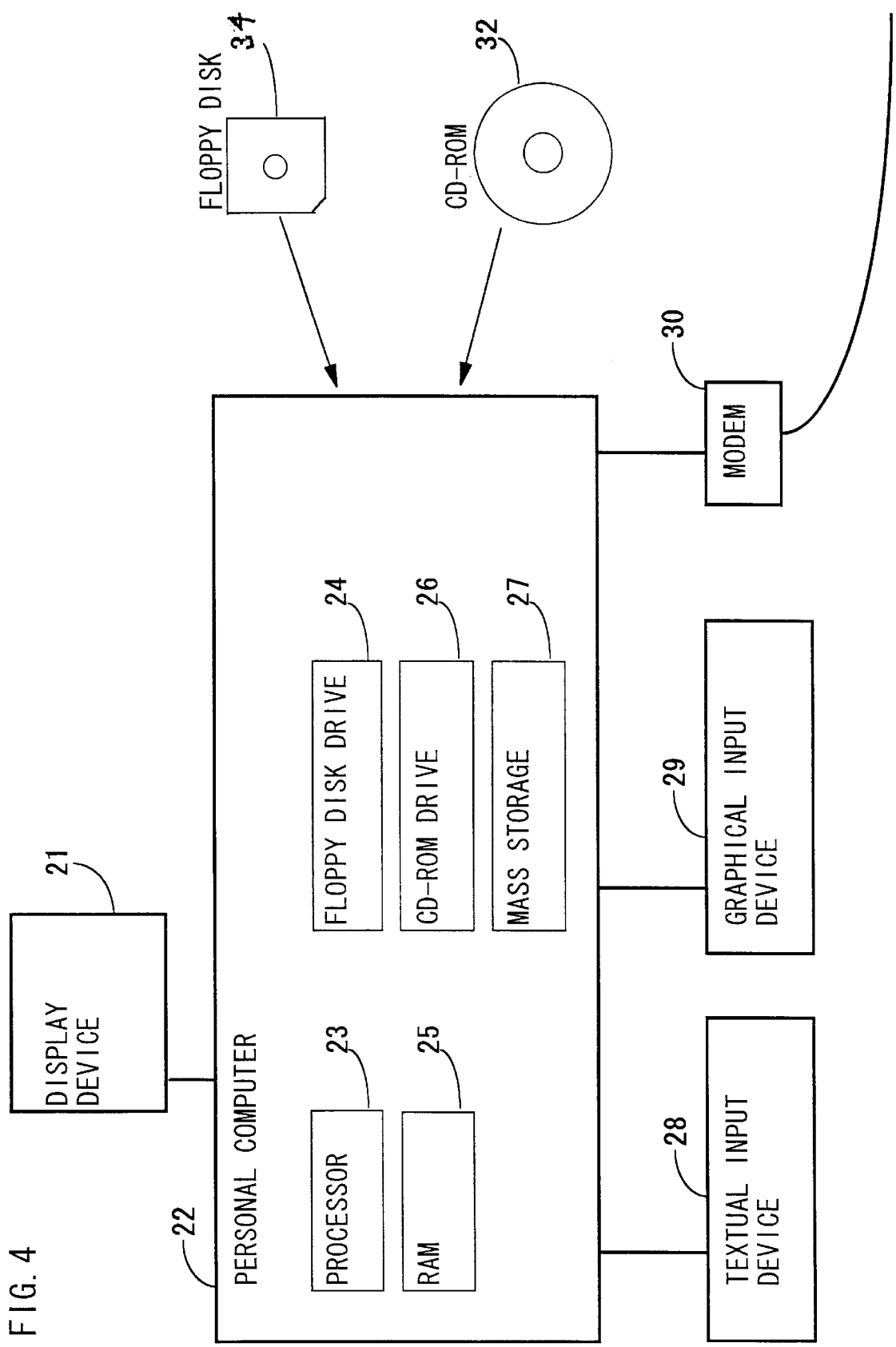
FIG.4 is a block diagram of a device according to the present invention.

Reference is now made to FIG. 4 wherein there is shown a block diagram of a learning system of the present invention. The system includes a personal computer 22, a textual input device 28, a graphical input device 29, a display device 21 and a modem 30. The means for interconnecting the computer 22 to the various components shown in FIG. 4 is well known in the art.

The personal computer 22 can be a personal computer having a microprocessor 23, such as an Intel Pentium (tm) or similar, at least 32 MB random access memory (RAM) 25, mass storage (hard disk drive) 27, a floppy disc drive 24 and a CD-ROM drive 26. It will, of course, be understood that any computing system having equivalent functional and operational capabilities may be substituted for the personal computer 22. The floppy disc drive 24 allows the computer 22 to receive and access a floppy disk 31 containing program data and user data. Such data is accessed directly from the floppy disc 31 and/or stored by the computer in, and accessed from RAM 25 and/or mass storage (hard disk drive) 27 as necessary.

The display device 21 preferably comprises an SVGA monitor for providing a display of high quality images.

The textual input device 28 can be, for example, a standard QWERTY-type alphanumeric keyboard, with function keys, through which the system user may both input alphanumeric text for processing and/or display by the computer 22 and select certain functions and operations for computer execution. The graphical input device 29 can be either a joystick, mouse, trackball, or other pointing device as desired, to provide the computer user with a pointing and selecting device for on-screen selection of options and features in a well known manner (commonly referred to in the art as a "point-and-click" operation). It will, of course, be understood that other types of input devices may be used. For example, the display device 21 may further include a touch screen capability. In addition, an audio system may be used for audible input with the addition of speech recognition functionality to the processor 23.

The processor 23 controls operation of the present system, including controlling all communications by and between the personal computer 22 and the textual input device 28, the graphical input device 29, the display device 21 and the modem 30. The personal computer 22 operates according to a system operation program downloaded from either the floppy disc 31 or the mass storage (hard disk drive) 27 to the RAM 25. The user of the system controls the functioning and execution of the system operation program, and therefore the operation of the system, by providing commands input via the textual and graphical inputs 28 and 29, respectively.

The operation of the system of the present invention will be described in connection with its preferred embodiment as a chemical information maintenance tool. It will, of course, be understood that the disclosed functionality provided by the system of the present invention may be equally applicable to and appropriate for other educational and skill training exercises.

The program according to the present invention is stored in a floppy disk 31, and this floppy disk is loaded into the floppy disk drive 24, thereby operating the personal computer 22. The program may also be stored on mass storage (hard disk drive) 27 or the semiconductor memory such as ROM and the like, instead of the floppy disk.

In order to use the present system, the user must first create a text file with a text editor, or access a text file which was previously created. Next the user converts the text file into a text file for "fill-in-the-blanks" question program as shown in FIG. 5. In the method shown in FIG. 5, the process is started at step 50, and at step 51 a text file is opened with a text editor. At step 52, key words for the fill-in-the-blanks portion are selected, and surrounded with square brackets as shown. The text file is then stored in an appropriate storage device at step 53, and the text editor is closed at step 54. Step 55, therefore, indicates the completion of the conversion of the text file for the fill-in-the-blanks portion.

FIG. 1 is a example of the text file converted according to this invention. As you see, the user must only insert "[" and "]" to bracket the information element, such as a numeric, word, phrase or sentence, using a conventional text editor. If the user wants to display not only text but also images, the user inserts a symbol such as "@" into the text file to determine the position and size of the rectangle image area, and writes the image file name in the rectangle image area as shown in FIG. 6. Then, a user creates the image file specified in the image area in the text file with a graphics editor, and stores it in the same folder as the text file is stored. In FIG. 1, therefore, the square brackets that are mentioned in step 52 are shown as brackets 11, and the @ portions for the images are shown as item 12.

Image files, such as icon files, bitmap files and jpeg (.jpg) files, contain rectangle image data. In order to determine the position and size of a rectangle image area in a text file, it is sufficient to specify the upper left and lower right corner of the rectangle area. Referring to FIG. 6, step 60 initiates the image file processing portion of the invention. At step 61, a text file is opened with a text editor, and at step 62, the @ symbols 12 are placed at the upper left and lower right corners of a rectangle area where the images are sought to be displayed. The image is shown as a cloud 14 in FIGS. 2 and 3. At step 63, the image file names are written in the selected image area, so that the appropriate image file is placed in the selected image location. The text file is closed at step 64, and the text editor is closed at step 65. At step 66, a graphics editor is opened, and the image files, if not already created, are created within the graphics editor. If the image files have already been created, steps 67–69 are unnecessary. After the image files are created at step 67, however, the files are then stored at step 68, the graphics editor is closed at step 69, and the process is finished at step 70.

Figure 7:
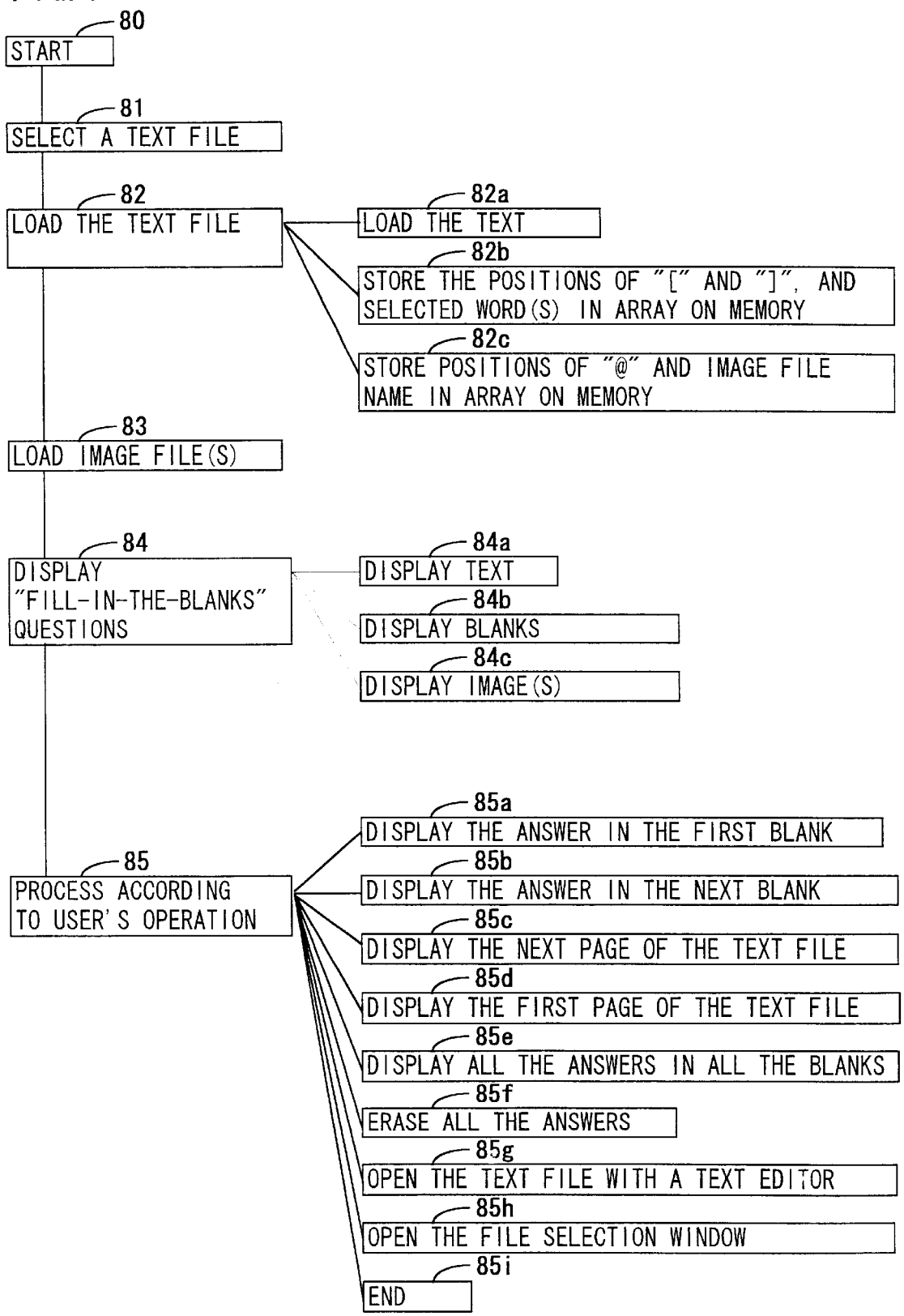
FIG.7 is a flow chart of the process performed according to the invention.

FIG. 7 shows the flow chart/block diagram of a method performed by the system. After storing the above text file, and image files if necessary, the user starts the present system program at step 80. The system program retrieves the list of text files stored in the storage medium, and shows a file selection window containing the list of text files. The user selects the converted text file at step 81 with the graphical input device 29 (point-and-click) or textual input device 28.

In response to the user's selection of the text file, further execution of the system program causes the computer 22 to retrieve and load the text file at step 82, performing substeps 82a–82c, if necessary and loads image files if necessary at step 83. The bracketed portions and the positions of "[" and "]" (vertical position is the line number and horizontal position means how many characters there are before each of the brackets) are clearly in the text file and displayed as "fill-in-the-blanks" windows at step 84, as shown in FIG. 2.

Referring to FIG. I and FIG. 2, the selected portions bracketed with "[" and "]" 11 are replaced by blank boxes or blank spaces 13 and rectangle image area 12 defined by "@" is replaced by the cloud image 14.

The page depth of this window is, for example, 9 lines and command buttons such as "Show" button 15, "NextFile" button 16, "SelectFile" button 17, "Edit" button 18 and "End" button are displayed in the lower part of the window.

In response to either clicking on the "Show" button 15 with the graphical input device (point-and-click) or pushing on Shift key on the keyboard, further execution of the system program causes the computer 22 to display the answer in the first or next blank box. If answers are filled in all the blank boxes, the next page of the text file is shown. If the last page is being shown and all the blank boxes are filled in, the first page of the text file is displayed with all the answers in the all blank boxes deleted.

FIG. 3 is a window displaying the same window as FIG. 2. The user must only press the Shift key on the keyboard to display answers in blank boxes, display the next page, or display the first page with deleting all the answers in the blank boxes. The system program determines what should be the next process and executes the process.

FIG. 8 shows how to determine the next process when the user presses the shift key. First the system program recognizes that Shift key is pressed, or other command action is taken such as the "Show" button is clicked at step 91. If the Shift key is pressed, the system examines whether there is a blank box without an answer at step 92. If there is at least one blank box without an answer, the system fills in the answer in the first blank box without answer at step 96. If there is no blank box without an answer, the system examines whether there is the next page at step 93. If there is a next page, the system displays the next page at step 97. If there is no next page, this means that the system is displaying the last page, the system erases all the answers in all the blank boxes at step 94, and displays the first page of the text file at step 95. Because of this determining process, user must only press Shift key to cause the system perform desired operation.

In response to clicking on the "NextFile" button 16 with the graphical input device 29, further execution of the system program causes the computer 22 to retrieve and display the next file listed in the list of the file selection window(not shown). The "NextFile" button 16 also displays which file is the next file.

In response to clicking on the "SelectFile" button 17 with the graphical input device 29, further execution of the system program causes the computer 22 to display the file selection window. The user can select another file as appropriate.

In response to pushing a command key such as the F7 key, further execution of the system program causes the computer 22 to display all the answers in all the blank boxes.

In response to pushing another command key such as the F8 key, further execution of the system program causes the computer 22 to delete all the answers in all the blank boxes.

In response to clicking on the "Edit" button 18 with the graphical input device 29, further execution of the system program causes the computer 22 to open the text file that is shown now with a text editor. The user edits the contents of the text file, such as adding additional comments, deleting brackets or adding brackets, and stores the text file on the storage medium. When the user closes the text editor, the present system program recognizes that the text editor was closed and retrieves and displays the edited text file.

In response to clicking on the "End" button 19 with the graphical input device 29, the computer 22 will end the current learning session, close all related files, and return to the computer operating system.

A more detailed example of a way in which the present invention operates is as follows. As mentioned previously, characters such as square brackets are used to indicate the position of blank boxes, and to contain the answers for the blank boxes.

If the text file for "fill-in-the-blanks" contains only 2 sentences which are:

"I like [oranges] best of all fruits.

She is good at [skating] [of] all sports."
then the program creates arrays A(1), B(1), C(2) and D(2), and their data will be:

A(0)="I like [oranges] best of all fruits."
A(1)="She is good at [skating] [of] all sports."
B(0)="I like best of all fruits."
B(1)="She is good at all sports."
C(0).PositionY=1 (This is the line number.)
C(0).PositionX1=8 (Because "[" is the 8th character.)
C(0).PositionX2=16 (Because "]" is the 16th character.)
C(1).PositionY=2
C(1).PositionX1=16 (Because "[" is the 16th character.)
C(1).PositionX2=24 (Because "]" is the 24th character.)
C(2).PositionY=2
C(2).PositionX1=26

C(2).PositionX2=29
D(0)="oranges"
D(1)="skating"
D(2)="of"

Because array indexes begin at 0, these arrays have two or three elements.

As you see, array A contains the original text, array B contains the text with bracketed portion replaced with space characters.

Because there are two sentences, the maximum index number is 1.

Array C contains information about the position of "[" and "]", and array D contains answers.

Because there are 3 bracketed portions, the maximum index number is 2.

In order to make these arrays, the program looks for "[" first and "]" second. A programming language such as Visual Basic (tm) has an "InStr" function, which is useful for searching a character in a sentence.

For example, the following statement result in 2 being returned and assigned to "Result".

Result=InStr("She likes apples.", "h")

Using "InStr" function, the horizontal position of "[" result in 8, because it is the 8th character in the A(0) sentence. And the answer of the first blank box begins "o" the next character of "[" and ends "s" the previous character of "]", so it result in "oranges".

As a result of these operations, the bracketed portions of the text are therefore replaced with blank boxes according to the following process:

(a) The system program retrieves the selected text file and stores all line of the text in an array named OrigTxt( ).
(b) It verifies the number of "[" is the same as that of "]".
(c) It makes text with bracketed portions replaced with space characters from the text in OrigTxt( ) and stores the text in another array named ModiTxt( ).
(d) It stores the position of "[" and "]" in another array named PosBrkt( ).
(e) It stores the answers (character string between "[" and "]") in another array named Answer( ).

When the system program shows the "fill-in-the-blanks" question, it uses ModiTxt( ) and PosBrkt( ).

When the system shows answers in the blank boxes, it uses PosBrkt( ) and Answer( ).

Once the blank boxes have been created, a user inputs answers to the blank boxes as follows:

In response to pushing F9 key, further execution of the system program causes the computer 22 to erase all the answers in all the blank boxes and display a text box just over the first blank box. After the F9 key was pushed, the system program does not show answers in the blank boxes but allows the user to input textual answer using the keyboard. In other words, to push F9 key when displaying the answers is to change modes from Display Answer Mode to Input Answer Mode.

The user can input an answer into the text box in Input Answer Mode. If the user wants to input an answer into the next blank box, he or she pushes the Tab key, then the text box comes just over the next blank box leaving the user-inpuffed answer in the first blank box.

When the user finishes inputting answers, he pushes F10 key. In response to pushing F10 key, further execution of the system program causes the computer 22 to display in the blank boxes which user-inputted answers are correct or not. If the user-inputted answer is correct, it remains in the blank box. If incorrect, the user-inputted answer disappears and the correct answer appears in the blank box in bold-type with blue-colored.

Pushing the F10 key in Input Answer Mode will change modes to Evaluation Mode.

If the user pushes the F9 key a second time in Input Answer Mode or Evaluation Mode, the system program returns to Display Answer Mode.

The "NextFile", "SelectFile" and "Edit" buttons are effective only in Display Answer Mode.

If the user pushes the F11 key in Input Answer Mode, the system program enters Select Answer Mode. In this mode, when the user points to one of the blank boxes with mouse or input device 29, a small list box appears just below the blank box being pointed to. This list box contains a list of answers. One of these answers is a correct answer and others are incorrect answers. The incorrect answers are correct answers of other blank boxes. When the user select an answer by clicking it, the user-selected answer appears in the blank box. When the user moves the mouse pointer away from the blank box, the list box disappears.

If the user pushes the F11 key again in Select Answer Mode, the system program returns to Input Answer Mode.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A method of creating a computer-based teaching system, said method comprising:
    modifying a text file by inserting a first predetermined character at a first end of a first selected information element and inserting a second predetermined character at a second end of the first selected information element;
    creating a blank box in an area defined by the first and second predetermined character, said blank box replacing said first selected information element;
    storing data in memory representing said first selected information element; and
    providing a user interface which enables selective display of either the blank box or the first selected information element.

2. A method according to claim 1, said method further comprising:
    providing a second selected information element with a third predetermined character on a first end of the second selected information element and a fourth predetermined character on a second end of the second selected information element, said method further comprising
    displaying the text file with the first and second information elements replaced with blank boxes.

3. A method as recited in claim 1, wherein said first information element comprises text, and wherein said second information element comprises image data.

4. An apparatus for teaching information, said apparatus comprising:
    a display device;
    an input device for inputting commands of a user;
    a computer connected to said display device and said input device, said computer system including
        an editing unit for editing a text file;
        a storage unit for storing the text file;
        a position determining unit for determining selected positions of predetermined characters with respect to selected information elements in the text file;

a converting unit for converting the text file into a combination of text and selected blank boxes based upon the selected information elements.

5. An apparatus as recited in claim 4, said apparatus further comprising:

a determining unit for determining a next process;

selecting means for selecting for the display to display one of the data representing a selected information element and the blank box.

6. A computer-based teaching method, said method comprising:

modifying a text file by inserting a first predetermined character at a first end of a first selected information element and inserting a second predetermined character at a second end of the first selected information element;

storing the first selected information element in memory, and also storing position information of the first predetermined character and the second predetermined character;

replacing the first selected information element, first predetermined character, and second predetermined character with a third predetermined character; and selectively replacing the third predetermined character with the first selected information element based upon user commands.

7. A method as recited in claim 6, wherein said third predetermined character is a blank box.

8. A method as recited in claim 6, wherein said third predetermined character are blank spaces.

9. A method as recited in claim 6, further comprising a step of providing multiple choice answers which can be selectively input by the user to replace the third predetermined character; and indicating whether the selected answer is a correct or an incorrect answer.

10. A method as recited in claim 9, wherein said indicating step comprises comparing the selected answer to the first selected information element, wherein said first selected information element is considered a correct answer.

11. A method as recited in claim 6, said method further comprising:

providing a second selected information element with a fourth predetermined character on a first end thereof and a fifth predetermined character on a second end thereof.

12. A teaching system, said system comprising:

a modifying unit for modifying a text file by inserting a first predetermined character at a first end of a first selected information element and inserting a second predetermined character at a second end of the first selected information element;

a storing unit for storing the first selected information element in memory, and also storing position information of the first predetermined character and the second predetermined character;

a replacing unit for replacing the first selected information element, first predetermined character, and second predetermined character with a third predetermined character;

wherein the replacing unit selectively replaces the third predetermined character with the first selected information element based upon user commands.

13. A system as recited in claim 12, wherein said replacing unit replaces the first selected information element, the first predetermined character, and the second predetermined character with a blank box.

14. A system as recited in claim 12, wherein said replacing unit replaces the first selected information element, the first predetermined character, and the second predetermined character with blank spaces.

15. A system as recited in claim 12, further comprising an input unit for selectively inputting at least one of a plurality of multiple choice answers, and wherein said replacing unit selectively replaces the third predetermined character with the selected answer, said system further comprising an indicating unit to indicate whether the selected answer is a correct or an incorrect answer.

16. A system as recited in claim 15, wherein said indicating unit compares the selected answer to the first selected information element, and wherein the first selected information element is considered a correct answer.

17. A system as recited in claim 12, wherein said modifying unit modifies a text file by inserting a second selected information element with a fourth predetermined character on a first end thereof and a fifth predetermined character on a second end thereof.

\* \* \* \* \*